United States Patent [19]

Mansfield

[11] Patent Number: 4,863,501

[45] Date of Patent: Sep. 5, 1989

[54] METHOD OF EMPLOYING PLASMA FOR FINISHING START RODS

[75] Inventor: Robert J. Mansfield, Stow, Mass.

[73] Assignee: Polaroid Corporation, Patent Department, Cambridge, Mass.

[21] Appl. No.: 213,487

[22] Filed: Jun. 30, 1988

Related U.S. Application Data

[63] Continuation of Ser. No. 77,024, Jul. 22, 1987, abandoned, which is a continuation of Ser. No. 780,430, Sep. 26, 1985, abandoned.

[51] Int. Cl.$^4$ ............................................. C03C 25/02
[52] U.S. Cl. .................................... 65/3.11; 65/g262; 65/3.2; 65/18.2; 65/18.3; 65/30.1
[58] Field of Search ........................ 65/3.11, 3.12, 3.2, 65/18.2, 18.3, 30.1, 900, 3.13

[56] References Cited

U.S. PATENT DOCUMENTS

| | | | |
|---|---|---|---|
| 3,881,902 | 5/1975 | DeLuca | 65/12 |
| 3,933,454 | 1/1976 | DeLuca | 65/3 |
| 3,957,474 | 5/1976 | Kobayashi | 65/3 A |
| 4,082,420 | 4/1978 | Shiraishi | 350/96.31 |
| 4,286,978 | 9/1981 | Bailey | 65/3 A |
| 4,304,583 | 12/1981 | Aronson | 65/18.2 |
| 4,331,462 | 5/1982 | Fleming, Jr. | 65/3.12 |
| 4,338,111 | 7/1982 | Edshiro | 65/18.2 |
| 4,345,928 | 8/1982 | Kawachi et al. | 65/3.12 |
| 4,367,918 | 1/1983 | Pinnow | 350/96.30 |
| 4,388,094 | 6/1983 | Carpenter et al. | 65/18.2 |
| 4,402,720 | 9/1983 | Edshiro | 65/3.12 |
| 4,421,539 | 12/1983 | Edshiro | 65/3.12 |
| 4,440,556 | 4/1984 | Oh | 65/2 |
| 4,441,788 | 4/1984 | Guerder | 350/96.34 |
| 4,486,212 | 12/1984 | Berkey | 65/2 |
| 4,493,721 | 1/1985 | Auwerds | 65/3.12 |
| 4,533,378 | 8/1985 | Paek et al. | 65/3.12 |
| 4,579,571 | 4/1982 | Hicks, Jr. | 65/3.12 |
| 4,599,098 | 7/1986 | Sarkar | 65/3.12 |

FOREIGN PATENT DOCUMENTS

3332029 3/1984 Fed. Rep. of Germany .......... 65/31

*Primary Examiner*—David L. Lacey
*Assistant Examiner*—L. Johnson
*Attorney, Agent, or Firm*—Francis J. Caufield

[57] ABSTRACT

There is disclosed a method of finishing or smoothing the surface of an optical start rod through the use of plasma heat in an atmosphere which prevents contamination of the rod by residual water. Also there is disclosed a method of fabricating an optical waveguide wherein the start rod has deposited thereon silica soot and which is subsequently consolidated by a plasma.

10 Claims, 1 Drawing Sheet

METHOD OF EMPLOYING PLASMA FOR FINISHING START RODS

CROSS-REFERENCE TO RELATED APPLICATION

This application is a continuation of application Ser. No. 077,024, filed 07/22/87 now abandoned. in turn a continuation of application Ser. No. 780,430, filed 09/26/85, now abandoned

BACKGROUND OF THE INVENTION

The present invention relates broadly to a method of heat treating a silica start rod by a plasma and, more specifically, to an improved method of using heat of a plasma for finishing silica start rods of the type used in a soot deposition technique.

It is recognized generally that optical fibers are a superior medium of communication. For example, a single fiber can carry hundreds of times more information than a simple metal wire can. However, fiber optic systems have yet to approach the cost-performance characteristics of metal systems. For fiber optical technology to become successful commercially it must be produced at a competitive price. Therefore, it is important from a cost consideration standpoint to produce relatively large quantities at relatively low costs.

Aside from but related to production cost considerations, is the criticality of minimizing optical transmission losses to comercially acceptable levels.

Transmission losses or attenuation of light is due primarily to impurities causing scattering and/or absorbing of such light. Optical purity is extremely difficult to attain especially considering the fact that mminute quantities of impurities, for instance in the order of several parts per million, can add significantly to transmission losses. This possibility for contamination is compounded when it is considered that several steps are typically involved with the fabrication of optical fibers.

One major technique for fabricating optical fibers in an economical and mass production fashion is the so-called "soot deposition" process. Typically, in this process, glass precursor vapors are introduced into a hydrolyzing flame. The result is formation of adherent particulate material (i.e. soot) which is directed towards a rotating and translating start-up material upon which the soot adheres to form a soot preform. Ordinarily, the start-up mandrel is fabricated from fused silica or doped fused silica. Following deposition, the soot preform is dehydrated and then consolidated into transparent fused silica. Subsequently both the mandrel and consolidated preform are drawn, whereby the mandrel becomes the core and the consolidated preform becomes the cladding. From a commerical standpoint this approach is highly desirable since the deposition rates are generally rapid. For example, a soot preform capable of forming 20 kilometers of optical fiber may be prepared in a few hours.

One area of potential transmission losses is the interface between the start rod and the preform. This is due primarily to surface defects of the type that include particulate, cracks and scratches on the start rod. Even microscopic defects of the type noted can be troublesome. Such defects are difficult to avoid in the normal handling of such start rods, let alone are capable of easy detection. For minimizing transmission losses it is extremely important to have the surface of the start rod free of contaminants and essentially optically smooth.

A known approach for cleaning and smoothing the start rod is to etch the surface followed by a fire polishing technique. The etching removes the particulate contamination while the fire polishing causes the surface to soften which then allows inherent surface tension to facilitate smoothing of the external surface. However, by virtue of known fire polishing techniques impurities are still formed by reason of the combustion process caused by use of a conventional gas torch. A primary problem arising from conventional fire polishing is introduction of water into the start rod. By water it is meant OH, $H_2$ and $H_2O$. Such water leads to light absorption peaks or zones in the fiber and contributes significantly to transmission losses.

SUMMARY OF THE INVENTION

According to the present invention, there is provided a method of finishing a start rod by use of a plasma.

In an illustrated embodiment, the method of finishing a start rod comprises the steps of establishing a plasma within a vessel and a drying agent within the vessel. Included is the step of establishing relative motion between the start rod and the plasma so that successive shell-like peripheral portions of the start rod are heated by the plasma to a temperature which effects smoothing of the start rod surface.

According to such an embodiment, the start rod is heated in the presence of a dehydrating agent to insure that there is no contamination of the start rod by water impurities when subjected to the plasma heat. Further, the embodiment contemplates use of a plasma torch for effecting the heating.

Among the objects of the present invention are, therefore, the provision of a method which finishes or smooths a start rod by use of heat generated by a plasma; the provision a method of whereby a dehydrating agent is utilized to prevent any introduction of water impurities in the start rod during smoothing; the provision of a plasma torch to heat the rod; and the provision of a method wherein an optical waveguide fiber is produced by applying silica soot to the smoothed start rod and consolidating the soot into the start rod by a plasma consolidation process.

Other objects and further scope of applicability of the present invention will become apparent from the detailed description to follow when taken in conjunction with the accompanying sole drawing which is a diagrammatic view of a start rod being finished in accordance with the present invention.

BRIEF DESCRIPTION OF THE DRAWINGS

The drawing depicts a heat treatment vessel for cleaning and polishing a fused silica preform start rod so as to remove contaminants and smooth the surface thereof.

DETAILED DESCRIPTION

Figure 1:
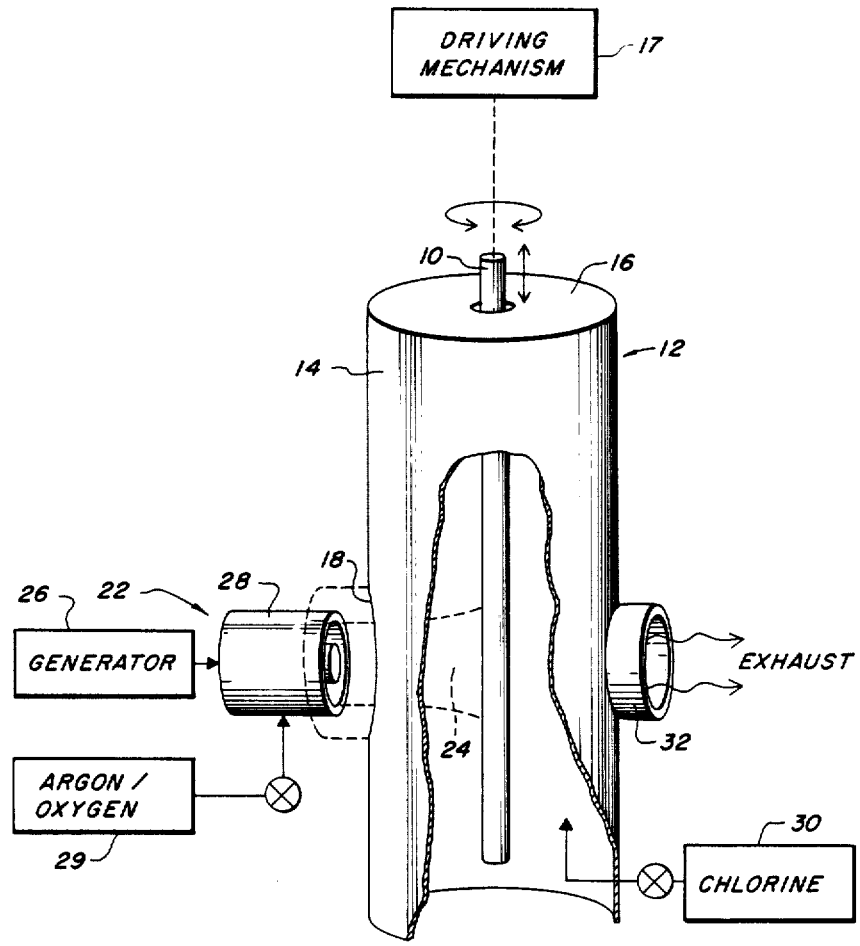

The drawing depicts a technique for cleaning and polishing a fused silica preform start rod 10 so as to remove contaminants and smooth the surface thereof. The heat treating step to be described is done prior to a soot deposition operation. Therefore, a detailed description of the soot deposition technique will be dispensed since it is not necessary for an understanding of the present invention. Preliminary to the plasma polishing or finishing operation, the start rod 10 is etched in a conventional manner not forming part of the present invention. Etching is performed to essentially remove particulate contamination present on the start rod surface. Since etching does not form part of the invention a detailed description thereof will be dispensed with. Suffice it to say, however, that a suitable etchant, such as hydrofluoric acid can be used.

In this embodiment, the start rod 10 is inserted into a heat treating vessel 12 which is defined by a high strength silica tube 14. Since a plasma torch is contemplated the walls of the tube will not be subject to intense temperatures. As a consequence, this allows the vessel walls to be of material other than silica. The silica tube 14 has a diameter and length which are adequate for allowing movement of the start rod 10 in a manner which will be described. For purposes of example and not limitation the tube 14 can have a diameter of several inches (e.g. 6") and a length of several feet (e.g. 4'). The ends of the tube 14 are capped with a known sealing assembly one one of which is shown and generally indicated by reference numeral 16. The sealing assemby 16 allows insertion, as well as rotation and axial translation of the preform start rod 10. A suitable driving mechanism 17 effects rotation and axial movement of the start rod 10.

Intermediate the length of the tube 14 is an opening 18 which cooperates with a plasma forming means. In this embodiment, the plasma forming means includes a plasma torch apparatus 22 which generates a plasma torch or flame 24. The plasma torch apparatus 22 includes a high frequency electrical generator 26 and a conventional nozzle 28 into which is introduced the working gases, such as argon and/or oxygen from a source 29 thereof. The nozzle 28 in a known manner forms the plasma and directs the torch or flame 24 thereof onto the surface of the start rod 10. The working gases for forming the plasma torch 24 are introduced at a rate which when coupled with the energy produced by the generator 26 is sufficient to heat at least an outer or shell-like peripheral region of the start rod 10 to a temperature which is, preferably, well above the softening temperature. The temperature reached could be between the softening temperature and the melting temperature. Temperatures above the melting temperature can also be used provided they do not affect more than a thin shell-like region of the rod that is desired to be treated. In other words, the heating should be done so that the rod doesn't deform. For purposes of illustration and not limitation the temperatures reached can be from about between 1800° C. and 2000° C. The outer circumferential shell-like region or band has a narrow depth, but is greater than the depth of any surface imperfections it is desired to remove. The noted temperature range is desired because it relatively quickly heats the outer circumferential shell-like region to the temperature necessary to convert the shell-like region to a viscous state. When the temperature causes the outer shell to soften, inherent surface tension of the viscous silica will be effective to allow physical smoothing of the surface. Since the polishing or finishing temperatures are so high and only the outer shell of the start rod 10 is to be softened, the start rod 10 is not kept in such a temperature range for a long period of time. For a start rod of 1 cm. in diameter, the linear advancement thereof by the driving mechanism can be in the order of 5 cm/min. Obviously, these values are given for purposes of illustration and not limitation. The temperature the start rod 10 is heated to and the depth of softening, is a function of plasma temperature and duration the start rod is subjected to the plasma, and can vary depending on the particular needs desired. Also such temperature will cause other impurities to vaporize off the surface.

Advantageously, the plasma torch 24, per se, does not introduce any water into the start rod 10. This is significant since, as noted, known fire polishing techniques introduce water into the start rod 10 during the polishing step.

To further prevent any contamination of the start rod 10 by residual water in the atmosphere inside the vessel, the present invention subjects the start rod to an atmosphere which includes a dehydration agent, such as chlorine. Towards this end, a source 30 of chlorine is connected to the tube 14 and creates a flow as they passed the torch 24 and to the exhaust opening 32. The chlorine is initially in a diatomic state. When subjected to the intense temperature of the plasma it turns into a monoatomic form. Chlorine in a monoatomic form reacts better with any water impurities in the vessel.

The present invention also envisions the use of other kinds of plasmas. For example, a plasma fire-ball of the kind described in my copending and commonly assigned application Ser. No. 746,742 filed June 20, 1985. If such a plasma was used the start rod would travel through the plasma fire-ball. This would be done at a controlled rate so as to effect the desired heating of the shell-like peripheral portions such that these portions become viscous or soften sufficiently to allow the inherent surface tension thereof to effect a physical smoothing of the exterior surface.

Subsequent to the foregoing approaches for effectuating the desired smoothness, the start rod is subjected to a soot deposition type of operation. The drawings do not show such a soot deposition technique since it is generally well-known. However, the following brief description of such a technique will be given in terms of defining a novel and improved method of making an optical waveguide from a start rod smoothed in the manner indicated above wherein the rod comprises a core that is to be enclosed by a cladding, wherein the latter has a lower index of refraction than the former.

In the soot deposition process, glass precursor vapors are introduced into a hydrolyzing flame (not shown). The result is formation of adherent particulate material (i.e. soot) which is directed towards a rotating and translating start rod (not shown) which has been finished in accordance with the previously noted steps of the present invention. The soot adheres to the start rod to form a soot preform. The start rod can be doped and the preform can also be doped. Doping can be done by any of several conventional steps, which, per se, do not form an aspect of the present invention. Since the start rod is intended to be the core of the optical waveguide the cladding, which is the soot preform in consolidated form, should, of course, have a lower index of refraction then that of the start rod.

In certain situations, it has been proposed to encompass the start rod with a thin layer of deposited glass soot. This is to form a soot preform which is to be consolidated. The glass soot material would have the same index of refraction as the start rod and would be consolidated. This is done so as to smooth the surfaces of the start rod or build up a slightly deformed rod by having the thin soot preform when consolidated fill the physical cracks of the start rod. Thereafter, another layer of silica soot is deposited on the consolidated smoothing layer and can also be consolidated. The present invention envisions that this last mentioned layer can be appropriately doped through suitable and well-known techniques.

The consolidation process of the forming soot deposited preform layers does not, per se, form an aspect of the present invention. However, it is preferred to consolidate in a manner set forth in the previously noted copending application. In such a consolidation process, the soot preform is passed through a plasma fire-ball so as to effect consolidation of the soot preform.

Before the consolidation step, it is desired to dehydrate the soot preform so as to remove impurities. Dehydration can follow conventional procedures or the one specified in the last-noted application.

Referring to the consolidation process, a plasma fire-ball is created in a heating vessel. In one embodiment a fire-ball with a core temperature of about 30,000° C. can be obtained. The periphery of the fire-ball is outof-contact with the vessel walls. The nature of a plasma is such that there is a significant heat gradient from its center to its periphery. At the periphery, the temperature is roughly a few hundred degrees centigrade, whereas the center may be 30,000° C.

For slowly lowering the glass soot preform and start rod into and through the plasma there is provided a lowering mechanism . The lowering mechanism lowers the preform and start rod into and through the plasma fire-ball at a rate which allows completion of consolidation. For example, a rate of several millimeters per hour would be sufficient. Of course, the lowering rate is a function of several parameters including the material being sintered, and the sintering or consolidating temperature. Thus, the example give is for purposes of illustration and not limitation. During consolidation, the soot preform is sintered at which time it consolidates or is fused into a transparent glass body that forms the cladding. The soot preform has already been dehydrated to remove water-related impurities. Following consolidation, the fused silica is withdrawn from the heating vessel, whereupon it may be subsequently drawn by conventional steps into an optical fiber.

Since certain changes may be made in the abovedescribed system and method without departing from the scope of the invention herein involved, it is intended that all matter contained in the description or shown in the accompanying drawing shall be interpreted as illustrative and not in a limiting sense.

What is claimed is:

1. In a process for making a preform for the manufacture of an optical waveguide fiber having a core, a cladding which has a lower index of refraction than said core and an optical interface between said core and said cladding, the improvement comprising the steps of:
   providing a previously formed, consolidated fused silica start rod to form said core and thus having an index of refraction the same as said core but having surface imperfections which would interfere with said optical interface by the direct deposit on said surface imperfections of silica material in soot form for consolidation to enclose said start rod with fused silica to form said cladding and thus having an index of refraction the same as said cladding
   establishing a heating zone within a vessel by heat generated by a plasma, said plasma being introduced into said vessel;
   establishing relative motion between the start rod and the heating zone so that successive portions of the start rod are heated to a viscous state in a peripheral region to a depth at least as great as the depth of any surface imperfections on said start rod and then returned to a solid state after leaving said heating zone to provide a smooth, imperfection-free exterior surface on said start rod; and
   depositing silica material in soot form directly onto said smooth, imperfection-free exterior surface to form a cladding
   said start rod and said cladding forming a preform;
   consolidating and drawing a waveguide fiber directly from said preform.

2. The process of claim 1 including the step of establishing a dehydrating atmosphere in the vessel containing said heating zone.

3. The process of claim 2 wherein saids dehydrating atmosphere establishing step comprises the step of introducing diatomic chlorine gas into said vessel whereby the temperature of said heating zone effects a conversion of said chlorine gas into a monoatomic state.

4. The process of claim 1 wherein said deposited fused silica soot has an index of refraction less than the index of refraction of said start rod.

5. The process of claim 4 additionally including the step of forming an additional ayer of soot over said first deposited fused silica soot, said additional layer having a lower index of refraction than said start rod.

6. The process of claim 1 wherein said deposited fused silica soot has the same index of refraction as said start rod.

7. The process of claim 6 additionally including the step of doping said deposited silica soot with an index of refraction lowering material.

8. The process of claim 1 additionally including the steps of:
   doping said deposited silica soot so as to produce a layer having a lower index of refraction than said start rod;
   providing a vessel having interior glass walls which encompasses said heating zone; and,
   introducing the start rod and silica soot into said zone so as to effect consolidation of the soot to form fused cladding of the optical waveguide.

9. The process of claim 1 wherein the peripheral portions of said start rod are heated to a temperature of at least 1800° C.

10. The process of claim 1 wherein the peripheral portions of said start rod are heated to a temperature of between 1800° C. and 2000° C.

* * * * *